Dec. 12, 1939.  L. C. McCARTY, JR., ET AL  2,183,279
AIRCRAFT CONSTRUCTION
Filed April 1, 1939  3 Sheets-Sheet 1
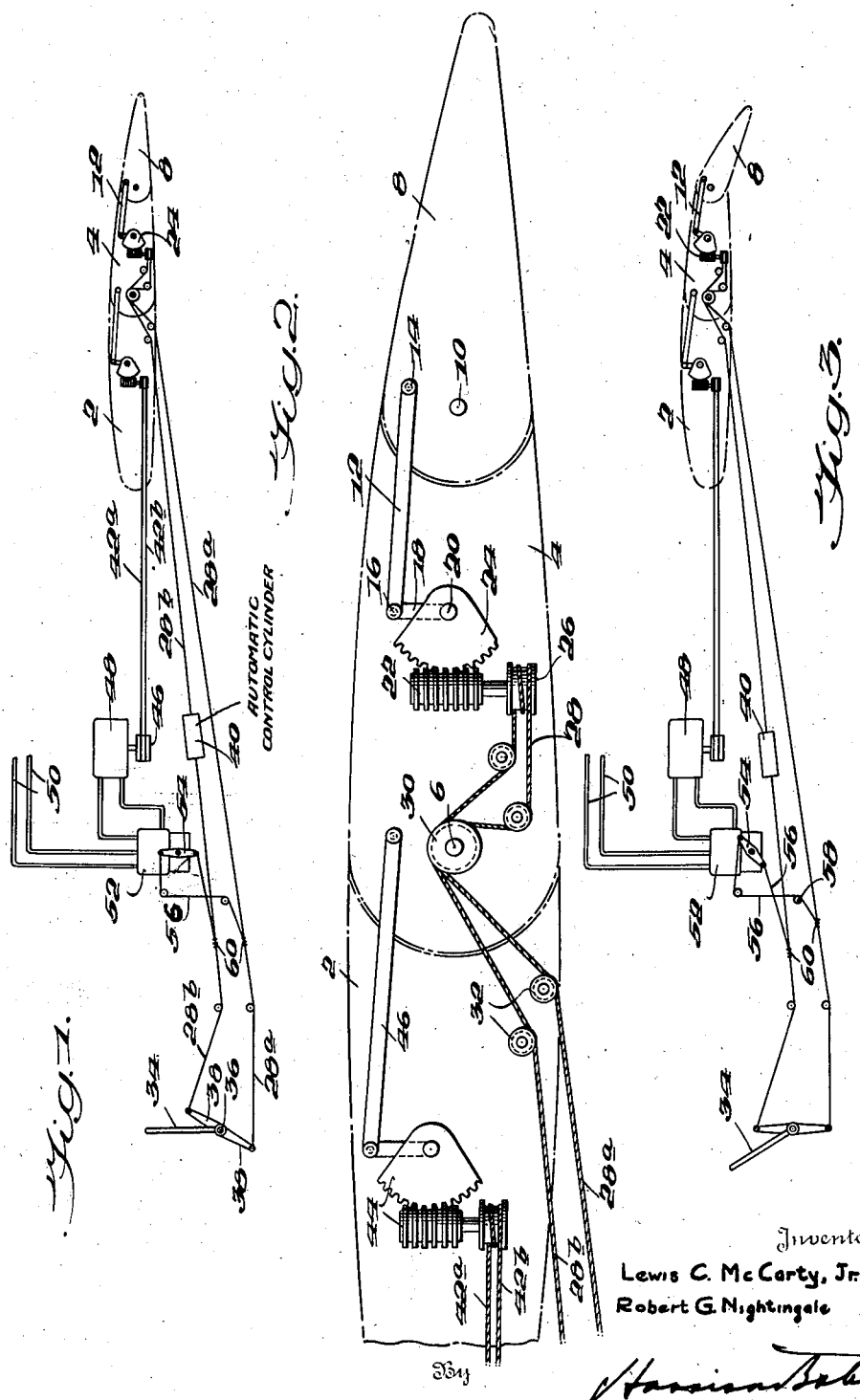
Inventor
Lewis C. McCarty, Jr.
Robert G. Nightingale

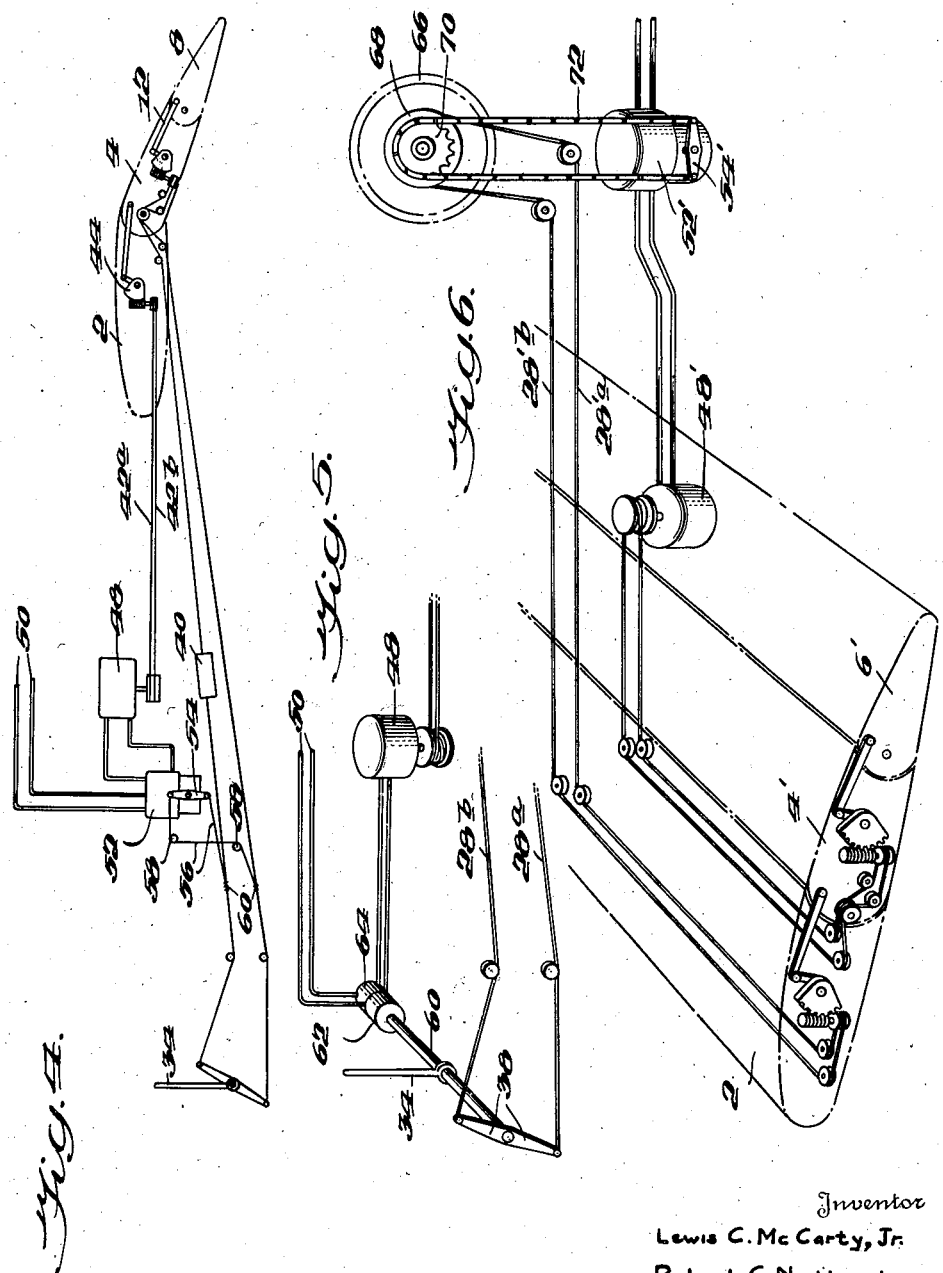

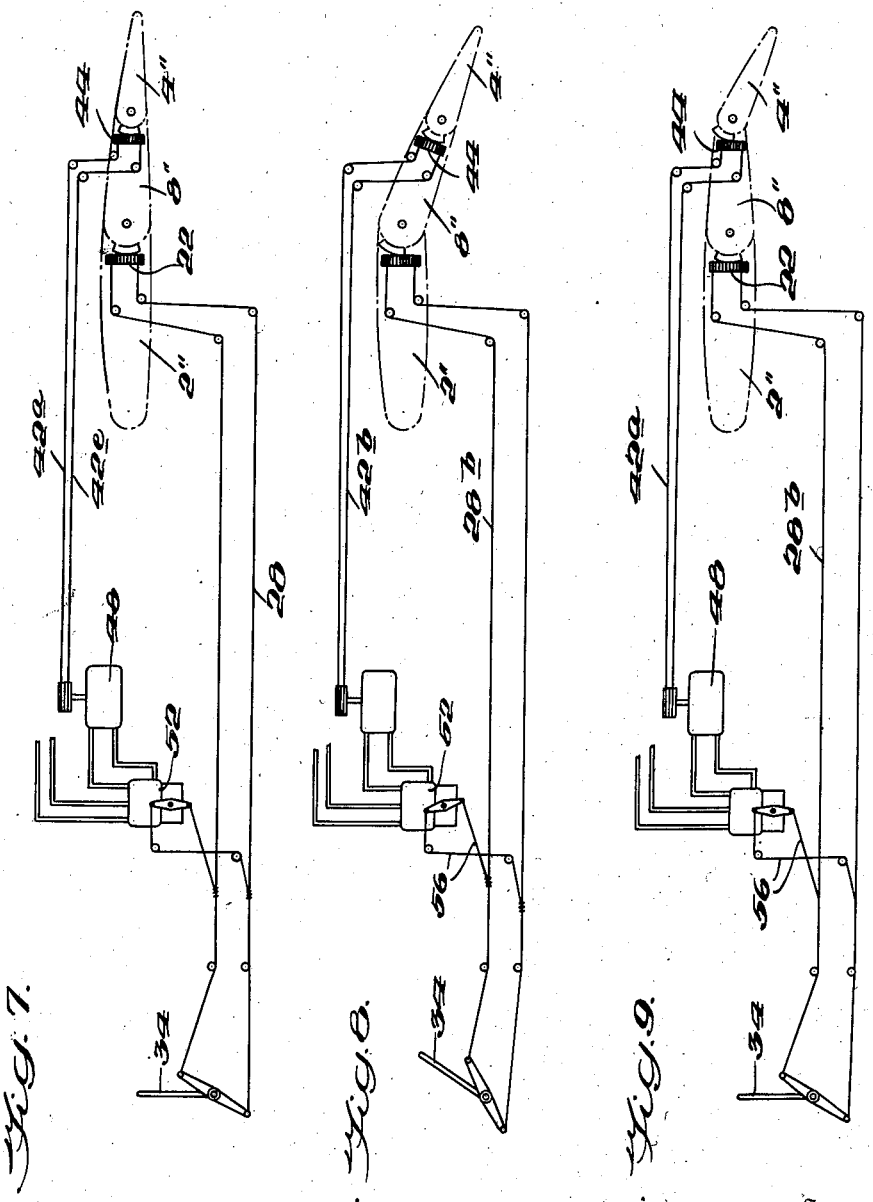

Patented Dec. 12, 1939

2,183,279

UNITED STATES PATENT OFFICE 2,183,279

AIRCRAFT CONSTRUCTION

Lewis C. McCarty, Jr., Baltimore, and Robert G. Nightingale, Towson, Md., assignors to The Glenn L. Martin Company, Baltimore, Md.

Application April 1, 1939, Serial No. 265,458

9 Claims. (Cl. 244—42)

The invention relates to the control of aircraft, and particularly to a selective automatic or manual control of trim and control surfaces.

The patent application of Watter Ser. No. 177,202 describes a control for aircraft in which a trim surface is hinged on the trailing edge of a fixed air foil, and a control surface is hinged on the trailing edge of the trim surface. With such a construction, when the trim surface is set to a given angle, to trim the ship, and the control surface is moved, to a position out of alignment with the trim surface, it is evident that the possible movement of the control surface in one direction will be limited to less than the normal range. This means that when such control surface is operated its movement may be insufficient to produce the desired maneuver.

The primary object of the present invention is to provide control means for use with operating mechanism, preferably irreversible, for two movable surfaces one mounted on the other which will automatically cause a movement of the second surface whenever the first surface is moved with respect thereto so as to bring the surfaces back into proper position. Obviously this primarily permits the full movement of the first surface in each direction, so that any desired maneuver may be effected.

The invention is particularly directed to the type of aircraft in which a control surface is pivoted on a trim surface.

However, the same condition holds true where the trim surface is hinged on the trailing edge of the control surface. In this case the control surface is often moved from its intermediate position in alignment with the fixed stabilizing surface when the aircraft is trimmed. In this construction, the invention provides means for shifting the trim surface to a greater angle so that the control surface is naturally restored to its intermediate or aligned position.

A second object of the invention is to provide an arrangement of this type which is operable with automatic control, and particularly with combined manual and automatic control.

A further object of the invention is to provide an arrangement of this type which operates automatically through a servo unit, this servo unit being controlled either by manual or by automatic operation of the control surface to move the trim surface.

The invention is applicable in its broadest aspect both to the wing or sustaining surface and the two tail surfaces, that is, the horizontal and vertical stabilizing surfaces, or, in other words, to any construction having two movable surfaces, particularly where one is mounted on another.

Further objects of the invention will appear more fully from the following description, particularly when taken in conjunction with the accompanying drawings which form a part thereof.

In the drawings:

Fig. 1 shows one modification of the invention with the surfaces in aligned position;

Fig. 2 is an enlarged detail view of the air foil showing the irreversible control mechanism;

Fig. 3 is a similar view to Fig. 1 showing the parts out of alignment;

Fig. 4 is a similar view showing the parts in alignment after the automatic regulation has taken place;

Fig. 5 shows a modified form of control arrangement;

Fig. 6 shows a control arrangement particularly adapted for a wing;

Figs. 7, 8 and 9 show a similar arrangement for a structure in which the trim surface is mounted on the control surface.

As shown in Figs. 1 to 4, the air foil is represented merely by way of example as a horizontal stabilizer surface such as a tail surface.

This includes, in the manner shown in the application of Watter above referred to, a fixed portion 2, a movable trim portion 4 hinged or pivoted at 6 on the trailing edge of the fixed portion 2, and a control portion 8 pivoted at 10 on the trailing edge of the trim portion 4.

A suitable irreversible control mechanism is provided for the operation of the control surface 8, this mechanism being carried by the trim surface 4. For example, the control surface 8 could be operated by a link 12 pivoted at 14 to the control surface and at 16 to a lever 18 pivoted at 20 on the trim surface 4. Movement of the lever 18 is produced by a worm 22 engaging a segment gear 24 fixed to lever 18, and rotated through sheave 26 by a control cable 28. The two ends of control cable 28 pass over two pulleys 30 mounted on the axis 6, and thence extend to pulleys 32 mounted on the fixed surface 2. The two portions of the control cable are indicated at 28a and 28b extending forward toward the control member.

The control column itself is indicated at 34. It is pivoted at 36, and has two arms 38 to which the cable portions 28a and 28b are connected. It is evident that when the control column is tilted in one direction or the other it will cause the tilting of the control surface 8.

The device may also be automatically controlled where desired by means of any suitable type of automatic control, such as the Sperry Gyropilot or the like. The Sperry Gyropilot, for instance, has a power cylinder into which fluid under pressure is delivered to operate the controls whenever the plane leaves its desired course. Such a cylinder is indicated in the drawings at 40, operating on the control 28b.

The trim surface 4 is operated by a cable having two parts 42a and 42b connected to a second irreversible control unit indicated at 44, similar to that described above, and connected through link 46 to the trim surface 4. Cables 42a and 42b pass around a sheave 46 operated by a fluid current or other suitable motor 48. Fluid is supplied to motor 48 from any suitable source through pipes 50 and valve mechanism 52. This consists of a valve in the inlet pipe of the motor operated by a lever 54 on the outside of the valve unit, the valve in the position shown in Fig. 1 closing the fluid supply lines, but when tilted in either direction causing fluid to be supplied to opposite sides of the motor to drive the same in opposite directions.

To opposite ends of lever 54 are connected cables 56. These cables pass over pulleys 58 and then are connected at 60 to the cables 28a, 28b.

In normal position, or, in other words, when the control column 34 is upright and the control surface is in alignment with the trim surface, connections 60 will be vertically aligned, and lever 54 will be held vertically. If now, for example, the ship should turn out to be tail heavy, the control column will be moved forward to the position shown in Fig. 3. This will pull cable 28b forward and cable 28a will move backward, so that connections 60 will move with respect to each other. This will obviously cause a tilting of lever 54 and will operate the control unit 52 to admit fluid to one side of motor 48. This will then drive the sheave 46 and cause the trim member to move in the same direction in which the control member has already moved. As the trim member moves down, of course, it adds to the effect of the control member and therefore the control column will be moved back manually or automatically towards its vertical position to reduce the effect of the control member. This movement naturally tends to move the control member back towards alignment with the trim member. When the trim and control members are again aligned, the ship is trimmed, and the control column is in its neutral or upright position. Lever 54 has moved back to its vertical position, so that the servo-motor is again rendered inoperative.

It should be noted in this case particularly that the control column does not determine the position of the control surface with respect to the fixed surface, but instead determines the position of the control surface with respect to the trim surface. In other words, when the control surface and trim surface are aligned, the control column is in neutral position. It is thus evident that any disalignment between the trim and control surfaces will be immediately corrected, so that the control surface has its fullest possible range of movement in either direction whatever its position may be with respect to the fixed surface.

In the modification shown in Fig. 5, a different form of connection between the control for the control surface and the operating mechanism for the trim surface control valve is shown. The control column 34 is mounted on a shaft 60 to which the arms 38 are attached for operating cables 28a and 28b. The same shaft 60 also operates the movable element 62 of a valve mechanism 64, which controls the servo-motor 48. When the valve turns in either direction away from neutral, it opens communication to operate the servo-motor unit in opposite directions. The operation otherwise is the same as in Figs. 1 to 4.

Fig. 6 shows a similar mechanism particularly intended for a wing, having a sustaining surface 2', a trim surface 4' and a control or aileron surface 6'. The position of the trim surface 4' is determined by the turning of a hand wheel 66 operating a sheave 68 which controls cables 28'a and 28'b. The same sheave carries a sprocket 70 which operates a chain 72, the opposite ends of which are connected to lever 54' of control valve 52'. This control valve operates motors 48' which control the ailerons on the two wings. The operation is the same as described above, since any movement of the control wheel away from neutral position turns lever 54' and thereby operates control valve 52'.

In Figs. 7 to 9, the control surface 8" is hinged on the fixed stabilizing surface 2", and the trim surface 4" is hinged on the control surface 8". The controls are similar to those of Figs. 1 to 4, including stick 34 connected by cables 28a, 28b to irreversible mechanism 22, etc. for the control surface; and switch 52 controlled by cables 56 and controlling motor 48 which operates through cables 42a, 42b irreversible control mechanism 44 for the trim surface. Of course, however, mechanism 44 is carried by the control surface, while mechanism 22, etc. is carried by the fixed stabilizing surface.

This construction operates as follows: Fig. 7 shows all the parts in normal aligned position. Assuming that the plane is out of trim, for example tail-heavy, the control stick is moved to turn the control surface, and with it the trim surface, to balance the aircraft. This position is shown in Fig. 8. Since the control stick 34 is out of its normal position, valve 52 is opened and motor 48 operates to move trim surface 4" farther downward. The pilot naturally moves the stick back towards normal position as the trim surface moves downward, to preserve the trim. Finally the position shown in Fig. 9 is reached. Of course valve 52 is now closed, and trim surface 4" remains in its new position. On the other hand, control surface 8" is aligned with fixed surface 2" and therefore has its full range of movement in both directions.

While we have described herein some embodiments of our invention, we wish it to be understood that we do not intend to limit ourselves thereby except within the scope of the appended claims.

We claim:

1. In an aircraft having a fixed surface, a movable surface hinged to said fixed surface and a second movable surface hinged to said first movable surface, control mechanism for moving said second movable surface with respect to said first movable surface out of alignment therewith, and means, responsive to operation of said control mechanism such as to produce disalignment of the said movable surfaces, to move said first movable surface towards alignment with said second movable surface.

2. In an aircraft having a fixed stabilizing surface, a movable trim surface hinged to said fixed surface and a movable control surface hinged to said trim surface, control mechanism for moving said control surface with respect to said trim surface out of alignment therewith, and means, responsive to operation of said control mechanism such as to produce disalignment of the said movable surfaces, to move said trim surface towards alignment with said control surface.

3. In an aircraft having a fixed surface, a first movable surface hinged to the trailing edge of said fixed surface, and a second movable surface hinged to the trailing edge of said first movable surface, irreversible means mounted on said first movable surface for moving said second movable surface with respect thereto, control means for operating said irreversible means, a servo-motor, means connected to said servo-motor for moving said first movable surface with respect to said fixed surface, and means, responsive to movement of said control means such as to move said second movable surface out of alignment with said first movable surface, for causing said servo-motor to operate to move said first movable surface towards alignment with said second movable surface.

4. In an aircraft having a fixed surface, a trim surface hinged to the trailing edge of said fixed surface, and a control surface hinged to the trailing edge of said trim surface irreversible means mounted on said trim surface for moving said control surface with respect thereto, control means for operating said irreversible means, a servo-motor, means connected to said servo-motor for moving said trim surface with respect to said fixed surface, and means, responsive to movement of said control means such as to move said control surface out of alignment with said trim surface, for causing said servo-motor to operate to move said trim surface towards alignment with said control surface.

5. In an aircraft having a fixed surface, a trim surface hinged to the trailing edge of said fixed surface, and a control surface hinged to the trailing edge of said trim surface, irreversible means mounted on said trim surface for moving said control surface with respect thereto, cable means for operating said irreversible means, means to move said cable means, a servo-motor, means connected to said servo-motor for moving said trim surface with respect to said fixed surface, and means, responsive to movement of said cable such as to move said control surface out of alignment with said trim surface, for causing said servo-motor to operate to move said trim surface towards alignment with said control surface.

6. In an aircraft having a fixed surface, a trim surface hinged to the trailing edge of said fixed surface, and a control surface hinged to the trailing edge of said trim surface, irreversible means mounted on said trim surface for moving said control surface with respect thereto, cables for operating said irreversible means, means to move said cables, a servo-motor, means connected to said servo-motor for moving said trim surface with respect to said fixed surface, means to supply fluid to said servo-motor to operate the same, a valve in said fluid supply means, and means connected to said cables and to said valve whereby, upon movement of said cables such as to move said control surface, out of alignment with said trim surface said servo-motor is operated to move said trim surface towards alignment with said control surface.

7. In an aircraft having a fixed surface, a trim surface hinged to trailing edge of said fixed surface, and a control surface hinged to the trailing edge of said trim surface, irreversible means mounted on said trim surface for moving said control surface with respect thereto, cable means for operating said irreversible means, manual means to move said cable means, a servo-motor, means connected to said servo-motor for moving said trim surface with respect to said fixed surface, and means, responsive to movement of said cable moving means such as to move said control surface out of alignment with said trim surface, for causing said servo-motor to operate to move said trim surface towards alignment with said control surface.

8. In a device as claimed in claim 1, said control mechanism being automatic and irreversible.

9. In an aircraft having a fixed surface, a first movable surface hinged to the trailing edge of said fixed surface, and a second movable surface hinged to the trailing edge of said first movable surface, irreversible means mounted on said first movable surface for moving said second movable surface with respect thereto, irreversible means mounted on said fixed surface for moving said first movable surface with respect thereto, control means for operating each of said irreversible means, a servo-motor, means connecting one of said control means to said servo-motor, and means, responsive to movement of the other control means for causing said servo-motor to operate.

LEWIS C. McCARTY, Jr.
ROBERT G. NIGHTINGALE.